United States Patent [19]
Witt

[11] Patent Number: 5,741,007
[45] Date of Patent: Apr. 21, 1998

[54] DAMPER ROTATIONAL LATCH

[75] Inventor: Martin A. Witt, Tinley Park, Ill.

[73] Assignee: Illinois Tool Works Inc., Glenview, Ill.

[21] Appl. No.: 492,310

[22] Filed: Jun. 19, 1995

[51] Int. Cl.⁶ ............................................. F16F 1/06
[52] U.S. Cl. .................. 267/64.12; 267/226; 188/300; 403/377
[58] Field of Search ................... 267/64.12, 226, 267/174; 188/300; 403/376, 377, 13

[56] References Cited

U.S. PATENT DOCUMENTS

| | | | |
|---|---|---|---|
| 899,639 | 9/1908 | Vibber | 403/377 |
| 2,873,128 | 2/1959 | Leister | 403/377 |
| 4,629,167 | 12/1986 | Kimura et al. | 267/226 |
| 4,760,621 | 8/1988 | Stomquist | 16/85 |
| 4,948,103 | 8/1990 | Bauden et al. | 267/34 |

*Primary Examiner*—Matthew C. Graham
*Attorney, Agent, or Firm*—Schwartz & Weinrieb

[57] ABSTRACT

A rotational latching device for use with a damper device comprising a cylinder and a piston so as to hold the piston in the closed position includes a rotating latching member and a heart-shaped cam part. The cam part includes a V-shaped portion. The latch member includes a latch guide pin which is retained in a V-shaped portion of the cam part in the closed position and is unlatched therefrom when the front end of the piston is moved slightly into the cylinder. The rotating latch member comprises a one-piece construction, can be easily formed by injection molding, and is readily assembled.

18 Claims, 2 Drawing Sheets

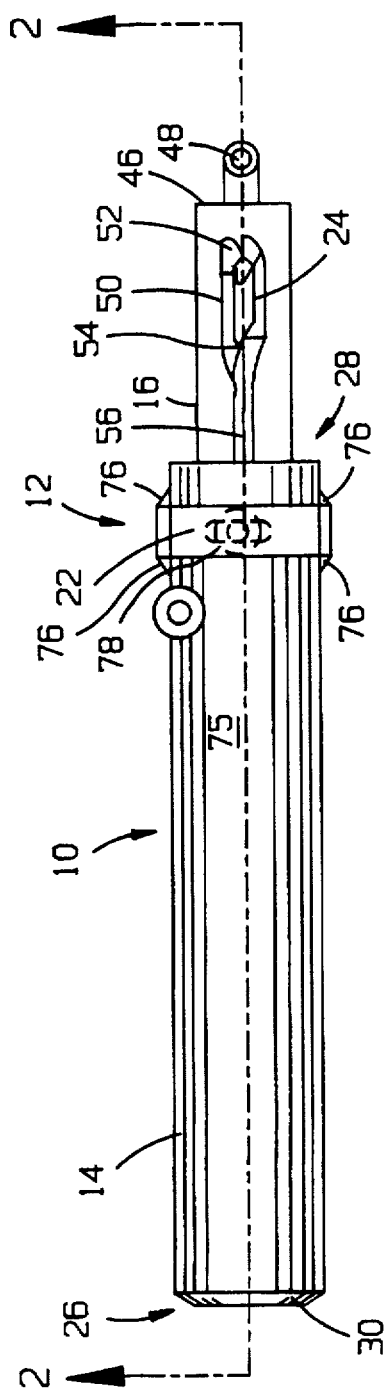
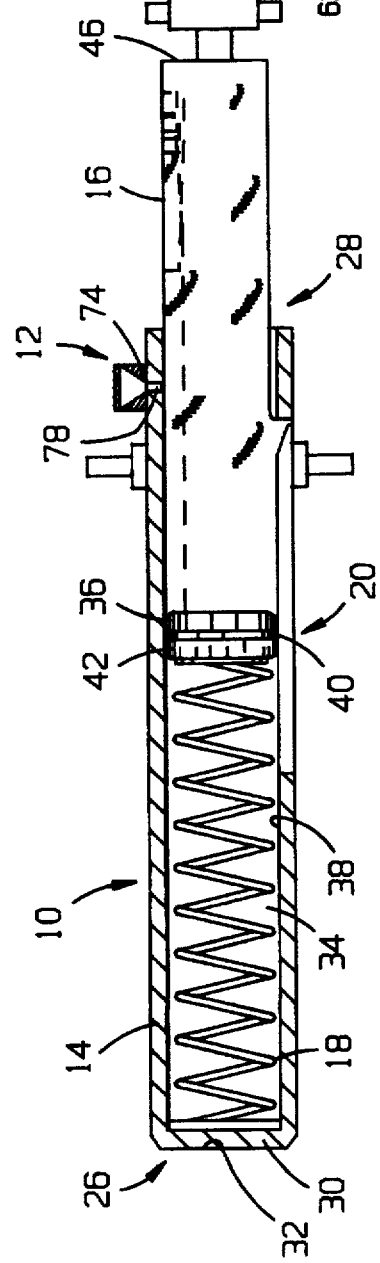
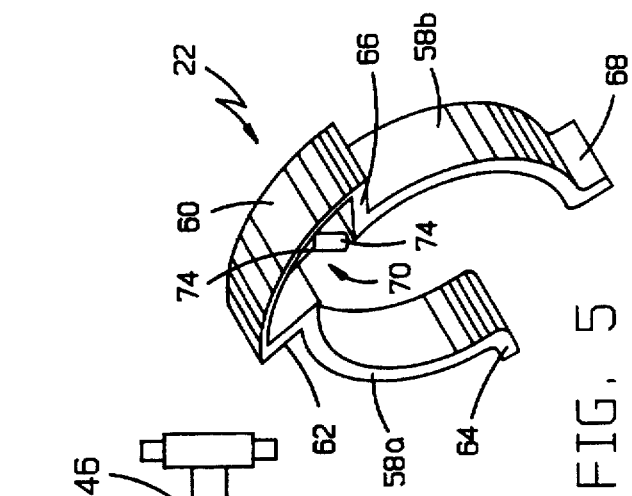

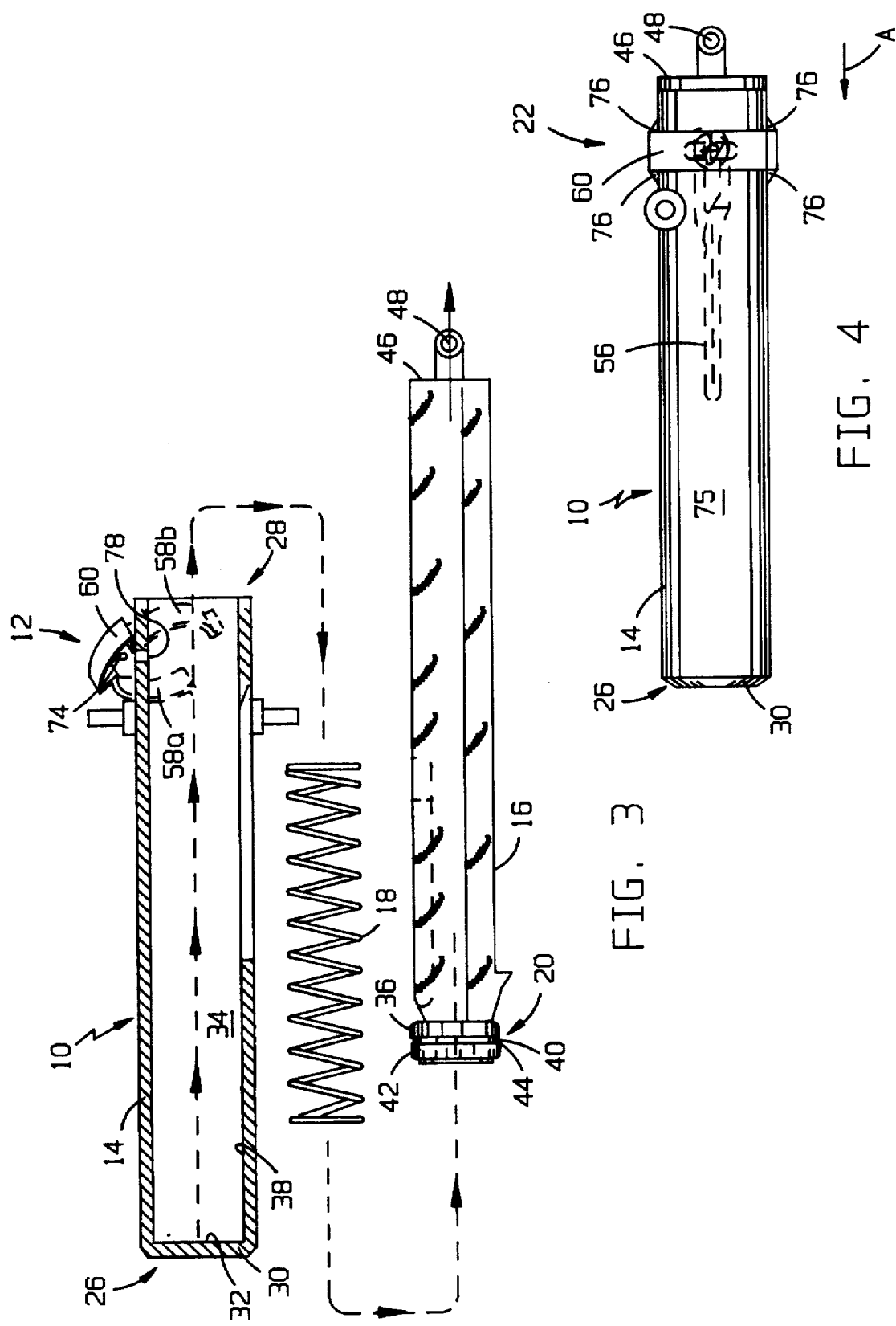

5,741,007

DAMPER ROTATIONAL LATCH

FIELD OF THE INVENTION

This invention relates generally to damper devices for dampening the opening of an openable object such as an ashtray, cupholder, glove compartment door or the like relative to a main body. More particularly, the present invention relates to an improved rotational latching device of a unique construction for use with a damper device comprising a cylinder and a piston so as to hold the piston in the closed position.

BACKGROUND OF THE INVENTION

There is known in the prior art a damper device having a "push—push" type of locking device formed by means of a heart-shaped cam part, a follower pin, and a retaining clip as is illustrated and described in U.S. Pat. No. 4,948,103 issued to Patrick J. Bowden et al. on Aug. 14, 1990, which is assigned to the same assignee as that of the present invention. This '103 patent is hereby incorporated by reference in its entirety. In FIGS. 1-3 of this patent, the heart-shaped cam part 22 of the locking device is formed adjacent the inner end of the rack-type gear 48. A cam recess 50 is disposed around the cam part 22 which has a V-shaped portion 52 arranged at its right end (FIG. 1) and a tip surface 54 positioned at its left end. The tip surface 54 is formed adjacent a longitudinally-extending slot 56 defined within the outer surface of the piston rod 14. The follower pin 24 has an L-shaped configuration formed by a first leg portion 58 and a second leg portion 60.

The first leg portion 58 is inserted into the slot 56 by means of a rectangularly-shaped cut-out 62 formed within a side wall 40 of the body member 12 adjacent the front end thereof. The body member 12 has a cylindrical configuration and further includes a small aperture 64 defined within the vicinity of the open front end 28 of the side wall 40 for receiving a projection 66 formed integrally with the second leg portion 60 of the follower pin 24. The retaining clip 26 has a C-shaped design which is adapted to be placed within arcuate grooves 68 disposed upon the outer surface of the side wall 40 of the body member 12. Accordingly, the first leg portion of the follower pin 24 is retained relatively movable within the slot 56 due to the engagement of the retaining clip 26 adjacent the second leg portion 60.

In the closed or retracted position of FIG. 4, a piston rod 14 is held or locked in place interiorly of the body member 12 until motion is required. In particular, the first leg portion 58 of the follower pin 24 is retained within the V-shaped open portion 52 of the cam part 22 so as to lock the piston rod 14 in the closed position within the interior of the body member 12. It will be noted that the coil spring 16 has been compressed within the chamber 36 of the body member 12.

In order to release the piston rod 14 from the closed position, the piston rod must be pushed gently to the left (FIG. 4) in the direction of the arrow A so as to move it further into the body member 12 and is then released. As a consequence, the first leg portion 58 of the follower pin 24 is caused to move in a counter-clockwise direction around the cam recess 50, thereby releasing or unlocking the piston rod 14. This allows the compressed coil spring 16 to push the piston rod 14 out from the body member 12 so as to produce a linear motion. As the piston rod 14 is being pushed out, the first leg portion 58 of the follower pin 24 will travel along the slot 56. Thus, the piston rod 14 will move from the closed or locked position (FIG. 4) to the opened or unlocked position (FIG. 1).

This prior art damper device suffers from the disadvantage that the locking device requires the use of the follower pin and the retaining clip which are generally formed of a metallic material such as stainless steel that must be manufactured separately with a high degree of precision. As a result, there is increased material cost for these separate component parts as well as time-consuming labor expenses associated with their assembly. Another problem encountered with this prior art damper device is that since these metal parts are so small they tend to become easily damaged and may also be lost during handling. Therefore, the assembled damper device may become non-functional (that is, unable to either latch or unlatch in its operation) when the parts are bent or deformed.

It would therefore be desirable to provide an improved damper latching device which utilizes a rotational latch member in order to produce a damper device with a reduced number of component parts that can be easily molded and readily assembled, thereby reducing manufacturing and assembly costs. The rotational latching device of the present invention represents an improvement over the damper device described above in the '103 patent.

OBJECTS OF THE INVENTION

Accordingly, it is a general object of the present invention to provide an improved rotational latching device of a unique construction for use with a damper device which is relatively simple and economical to manufacture and assemble, and also overcomes the disadvantages of the prior art damper devices.

It is an object of the present invention to provide an improved rotational latching device which comprises a reduced number of component parts that can be easily molded and readily assembled, thereby reducing manufacturing and assembly costs.

It is another object of the present invention to provide an improved rotational latching device which includes a rotating latching member and a heart-shaped cam part having a V-shaped portion, the latching member having a latch guide pin being retained in the V-shaped portion of the cam part in the closed position.

SUMMARY OF THE INVENTION

In accordance with the preferred embodiment, there is provided a rotational latching device for use with a damper device comprising a cylinder and a piston so as to hold the piston in the closed position. The latching device includes a rotating latch member and a heart-shaped cam part having a V-shaped portion. The latch member includes a latch guide pin which is retained in the V-shaped portion of the cam part in the closed position and is unlatched therefrom when the front end of the piston is moved slightly into the cylinder.

BRIEF DESCRIPTION OF THE DRAWINGS

These and other objects and advantages of the present invention will become more fully apparent from the following detailed description when read in conjunction with the accompanying drawings with like reference numerals indicating corresponding parts throughout the several views and wherein:

FIG. 1 is a top plan view of a rotational latching member of the present invention for use in a damper device, illustrated in the unlocked or opened position;

FIG. 2 is a cross-sectional view, taken along the lines 2—2 of FIG. 1;

3

FIG. 3 is an exploded view of the damper device of FIG. 1;

FIG. 4 is a top plan view similar to FIG. 1, illustrating the damper device in the locked or closed position; and FIG. 5 is an enlarged, perspective view of the rotational latching member, constructed in accordance with the principles of the present invention.

DESCRIPTION OF THE PREFERRED EMBODIMENT

Referring now in detail to the various views of the drawings, and in particular to FIGS. 1–3, there is shown a damper device 10 which incorporates a rotational latching or locking device 12 of the present invention. The damper device 10 may be utilized for controlling the opening and closing of an openable object such as a sliding cupholder or ashtray relative to a main body such as a stationary cupholder or ashtray housing mounted in a dashboard of an automotive vehicle. In operation, a damper device 10 causes the sliding cupholder or ashtray to be gently or smoothly pushed out (opened) at a dampened or controlled rate of speed when activated and to be pushed in (closed) at an undampened or higher rate of speed with a reduced force.

In particular, the damper device 10 is comprised of a cylindrically-shaped body member 14, a piston rod 16, a coil spring 18, and a one-way lip seal member 20. The rotational latching or locking device 12 constructed in accordance with the principles of the present invention is of a unique construction and includes a one-piece rotating latch member 22 and a heart-shaped cam part 24 which operate together to hold the sliding object in a closed position.

The cylindrically-shaped body member 14 is open at its one or front end 28 and is substantially closed at its other or rear end 26 by means of an end wall 30. The end wall 30 is provided with a central vent hole 32 which allows air to escape from the chamber 34 formed within the body member 14. The piston rod 16 is provided at its one or rear end with a circular plate 36 formed integrally therewith and which is disposed perpendicular to the axis of the piston rod 16.

The circular plate 36 has a diameter which is smaller than the diameter of the inner side wall 38 of the body member 14. Extending longitudinally from the plate 36 is a cylindrically-shaped connecting member 40 which terminates with a disc 42 disposed parallel to the plate 36 in an axially spaced-apart relationship. The disc 42 has a diameter which is substantially equal to the diameter of the plate 36. The connecting member 40 is formed with a diameter which is smaller than the diameter of the plate 36 and the disc 42. As a result, an annular recess 44 is formed between the plate 36 and the disc 42 for receiving the one-way lip seal member 20 which surrounds the connecting member 40.

The coil spring 18 is positioned between the end wall 30 of the body member 14 and the disc 42 of the piston rod 16. One end of the coil spring 18 is held by means of the inner surface of the end wall 30, and the other end of the coil spring 18 is held by means of the outer surface of the disc 42. Adjacent to the other or front end 46 of the piston rod 16, there is provided an opening 48 which may be attached to the sliding ashtray. In the alternative, the cylindrically-shaped body member 14 may be attached to the sliding ashtray and the piston rod 16 may be secured to the ashtray housing. In this manner, the ashtray can be freely opened and closed relative to the ashtray housing mounted in the dashboard.

The heart-shaped cam part 24 of the rotational latching device 12 is formed adjacent the outer end of the piston rod

4

16. A cam recess 50 is disposed around the cam part 24 which has a V-shaped portion 52 arranged at its right end (FIG. 1) and a tip surface 54 positioned at its left end. The tip surface 54 is formed adjacent a longitudinally-extending slot 56 defined within the outer surface of the piston rod 16.

With reference to FIG. 5 of the drawings, the rotational latching device 12 has a C-shaped design and includes a pair of arcuate-shaped side portions 58a and 58b and a bight portion 60 interconnected therebetween. In particular, one end of the bight portion 60 is joined integrally to one end of a first inwardly-directed connecting section 62. The other end of the first connecting section 62 is joined integrally to one end of the arcuate-shaped side portion 58a. The other end of the arcuate-shaped side portion 58a terminates in an outwardly flared portion 64. Similarly, the other end of the bight portion 60 is joined integrally to one end of a second inwardly-directed connecting portion 68. The other end of the second connecting section 66 is joined integrally to one end of the arcuate-shaped side portion 58b. The other end of the arcuate-shaped side portion 58b terminates in an outwardly flared portion 68. In the intermediate area of the bight portion 60, there is provided a latch guide pin 70 which is made of a suitable metallic material such as stainless steel or molded as an integral portion of the latch member 22 with the same material thereof. The guide pin 70 is formed of a triangularly-shaped upper section 72 and a lower projection 74.

The rotational latching device 12 is of a one-piece construction and is preferably formed of a flexible plastic material, such as 6/6 nylon or other similar plastic material, such as polypropylene which is fabricated by a conventional insert injection molding process or standard molding process. The arcuate-shaped side portions 58a–58b of the rotational latching member 12 are adapted to snappingly engage with the outer surface of the side wall 75 of the body member 14 between pairs of rotating latch guide bumps 76 disposed on each side of the body member. As this occurs, the lower projection 74 of the latch guide pin 70 is inserted into the slot 56 by means of an elliptically-shaped cut-out 78 formed in the top surface of the side wall 75 of the body member 14 adjacent the front end thereof. It should be noted that due to the flexible hinge areas created by the bight portion 60 and the connecting sections 58a, 58b the latch guide pin 70 is mounted so as to be vertically movable within the slot 56. Further, the guide pin 70 is permitted to move laterally within the elliptically-shaped opening 78 in a direction transverse to the longitudinal axis of the piston rod 16.

The operation of the rotational latching device 12 of the present invention can be best understood with reference to FIGS. 4 and 1. In the closed position of FIG. 4, it will be noted that the piston rod 16 is held or locked in place interiorly of the body member 14 until motion is required. As can be seen, the lower projection of the guide pin 70 is retained or locked within the V-shaped portion 52 of the cam part 24. In addition, the coil spring 18 has been compressed within the chamber 34 of the body member 14.

In order to activate the damper device 10, the front end 46 of the piston rod 16 is pushed slightly in the direction of arrow A (to the left) so the piston rod 16 is moved further into the body member 14 and is then released. As a consequence, the lower projection 74 of the guide pin 70 is now caused to move laterally (up) and around the cam recess 50 in a counter-clockwise direction, thereby releasing or unlatching the piston rod 16. This permits the coil spring 18 to push the piston rod 16 out from the body member 14 so as to produce a linear motion. As the piston rod 16 is being pushed out, the lower projection 74 of the guide pin 70 will travel along the longitudinally-extending slot 56 and is permitted to move vertically so as to maintain tracking within the slot. In this fashion, the piston rod 16 will be caused to move from the closed or locked position shown in FIG. 4 to the open or unlocked position illustrated in FIGS. 1 and 2.

In order to return the damper device to its closed position, the front end 46 of the piston rod 16 is again pushed to the left. In this manner, the lower projection 74 of the guide pin 70 is caused to move initially along the longitudinally-extending slot 56. As the guide pin 70 reaches the tip surface 54 of the cam part 24, it will then be moved laterally (down) toward the right end of the cam recess 50 in the counter-clockwise direction where it is stopped. Next, the front end 46 of the piston rod 16 is released. As a result, the lower projection 74 will move laterally (up) and into the V-shaped portion 52 of the cam part 24, thereby latching or locking the piston rod 16 with the rotating latch member 12 as shown in FIG. 4.

The rotational latching device of the present invention has the following advantages over the prior art:

(1) It reduces the number of individual component parts;

(2) It can be easily formed by injection molding and readily assembled; and (3) It is more economical to manufacture and assemble.

From the foregoing detailed description, it can thus be seen that the present invention provides an improved rotational latching device for use with a damper device comprising a cylinder and a piston so as to hold the piston in the closed position. The rotational latching device comprises a one-piece construction and includes a latch guide pin which is retained in the V-shaped portion of the cam part in the closed position.

While there has been illustrated and described what is at present considered to be a preferred embodiment of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiment disclosed as the best mode contemplated for carrying out the invention, but that the invention will include all embodiments falling within the scope of the appended claims.

What is claimed is:

1. A damper device, comprising:

a body member including a chamber, an open front end, and an end wall;

a piston disposed telescopically within said body member such that a piston rod thereof projects partially outwardly from said chamber of said body member through said open front end of said body member;

spring means disposed within said chamber of said body member and interposed between said end wall of said body member and said piston so as to bias said piston outwardly from said chamber of said body member;

first latching means defined upon said piston rod; and second latching means, for cooperating with said first latching means of said piston rod so as to retain said piston rod within said body member in a latched position until movement to an unlatched position is desired, comprising a one-piece latching member having first means for mounting said second latching means upon an external portion of said body member and a second means integral with said first means and projecting internally within said body member for engaging said first latching means of said piston rod.

2. A damper device as claimed in claim 1, wherein:

said first latching means is comprised of a heart-shaped cam part; and said second means of said second latching means comprises a latch member having a lower projection for being retained within a V-shaped portion of said cam part when said piston rod is disposed at said latched position and for being unlatched therefrom when a front end portion of said piston rod is moved slightly inwardly into said body member and released.

3. A damper device as claimed in claim 1, wherein said first means of said second latching means comprises a C-shaped member for engaging a peripheral section of said external portion of said body member and includes a pair of arcuate-shaped side portions, a bight portion, a first radially inwardly-directed connection section interconnected between one of said pair of side portions and said bight portion, and a second radially inwardly-directed connection section interconnected between the other one of said pair of side portions and said bight portion.

4. A damper device as claimed in claim 3, wherein said second means of said second latching means comprises a latch guide pin disposed upon an intermediate area of said bight portion.

5. A damper device as claimed in claim 4, wherein said second latching means is made of a flexible plastic material.

6. A damper device as claimed in claim 5, wherein said pair of arcuate-shaped side portions are adapted to snappingly engage with outer surface portions of a side wall of said body member between pairs of latch guide bumps located on each side of said body member.

7. A damper device as claimed in claim 6, wherein said body member includes an elliptically-shaped cut-out formed in a portion of the side wall adjacent the front end for receiving said latch guide pin.

8. A damper device as claimed in claim 7, wherein said latch guide pin is formed of a triangular-shaped upper section and a lower projection.

9. A damper device as claimed in claim 8, wherein said bight portion and said connection sections define flexible hinge areas so as to permit said lower projection of said guide pin to move radially with respect to a longitudinal axis of said body member.

10. A damper device as set forth in claim 1, further comprising:

means integral with a distal end portion of said piston rod disposed externally of said body member for connection to an object whose movement is to be damped.

11. In a damper device comprising a cylinder and a piston wherein said piston includes a piston rod which is telescopically movable with respect to said cylinder between an axially inward latched position and an axially outward unlatched position, the improvement comprising a latching device for latching said piston rod at said axially inward position with respect to said cylinder, wherein said latching device comprises:

first latch means defined upon said piston rod and comprising a substantially heart-shaped cam part having a V-shaped portion; and second latch means, for cooperating with said first latch means of said piston rod so as to retain said piston rod at said latched position until movement to said unlatched position is desired, comprising a one-piece latching member having first means for mounting said second latch means upon an external portion of said cylinder and a second means, integral with said first means, comprising a latch guide pin projecting internally within said cylinder for releasably engaging said heart-shaped cam part of said first latch means of said piston rod and being retained within said V-shaped portion of said heart-shaped cam part of said first latch means of said piston rod when said piston rod is moved to said axially inward latched position, and being unlatched from said V-shaped portion of said heart-shaped cam part of said first latch means of said piston rod when said piston rod is moved slightly inwardly into said cylinder and then released.

12. A damper device as claimed in claim 11, wherein:

said first means of said second latch means comprises a C-shaped member for engaging a peripheral section of said external portion of said cylinder and includes a pair of arcuate-shaped side portions, a bight portion, a first radially inwardly-directed connection section interconnected between one of said pair of side portions and said bight portion, and a second radially inwardly-directed connection section interconnected between the other one of said pair of side portions and said bight portion.

13. A damper device as claimed in claim 12, wherein:

said latch guide pin of said second latch means is disposed at an intermediate area of said bight portion.

14. A damper device as set forth in claim 12, wherein:

said second latch means is fabricated from a flexible plastic material.

15. A damper device as set forth in claim 13, wherein:

said first and second radially inwardly-directed connection sections are connected to said bight portion and said pair of side portions of said C-shaped member by flexible hinge members so as to permit said latch guide pin to move radially with respect to said cylinder.

16. A damper device as set forth in claim 12, further comprising:

two pairs of guide bumps fixedly mounted upon opposite side portions of said peripheral section of said external portion of said cylinder for receiving therebetween said pair of arcuate-shaped side portions of said first means of said second latch means when said C-shaped member of said second latch means engages said peripheral section of said external portion of said cylinder.

17. A damper device as set forth in claim 11, further comprising:

spring means interposed between an end wall of said cylinder and said piston for biasing said piston toward said axially outward unlatched position.

18. A damper device as set forth in claim 11, further comprising:

means integral with a distal end portion of said piston rod disposed externally of said cylinder for connection to an object whose movement is to be damped.

* * * * *